US006650514B2

(12) United States Patent
Schmitt

(10) Patent No.: US 6,650,514 B2

(45) Date of Patent: Nov. 18, 2003

(54) PROTECTION CIRCUIT FOR A FLUORESCENT LAMP

(75) Inventor: Harald Schmitt, Munich (DE)

(73) Assignee: Patent-Treuhand-Gesellschaft für Elektrische Gluehlampen mbH, Munich (DE)

(*) Notice: Subject to any disclaimer, the term of this patent is extended or adjusted under 35 U.S.C. 154(b) by 0 days.

(21) Appl. No.: 10/068,894

(22) Filed: Feb. 11, 2002

(65) Prior Publication Data

US 2002/0114114 A1 Aug. 22, 2002

(30) Foreign Application Priority Data

Feb. 20, 2001 (DE) ........................................ 100 08 138

(51) Int. Cl.[7] .............................. H02H 9/00; G05F 1/00

(52) U.S. Cl. ............................ 361/18; 361/18; 315/291

(58) Field of Search .............. 361/18, 91.1; 315/209 R, 315/210, 219, 224, 225, 226

(56) References Cited

U.S. PATENT DOCUMENTS 5,589,740 A * 12/1996 Rudolph et al. ............ 315/291
5,783,911 A * 7/1998 Rudolph ...................... 315/225
5,825,136 A * 10/1998 Rudolph ...................... 315/291
5,925,984 A * 7/1999 Fischer et al. .............. 315/291
6,078,144 A * 6/2000 Twardzik ................ 315/209 R
6,288,500 B1 * 9/2001 Klier ....................... 315/209 R

* cited by examiner

*Primary Examiner*—Brian Sircus
*Assistant Examiner*—Danny Nguyen

(57) ABSTRACT a protective circuit for a fluorescent lamp includes a third resistor (R3) that bridges a decoupling capacitor (C2), and a fourth resistor (R4) that connects a first reference point (A) to a positive pole of a DC voltage source ($U_Z$), the resistors being selected such that the reference points are at the same potential without the fluorescent lamp inserted.

13 Claims, 3 Drawing Sheets

PROTECTION CIRCUIT FOR A FLUORESCENT LAMP

DESCRIPTION

The present invention relates to a protective circuit for a fluorescent lamp with a first and a second lamp filament, comprising a DC voltage source with a positive and a negative pole, a half-bridge arrangement with a first and a second switch, the half-bridge arrangement being fed by the DC voltage source, and the first and the second switch being interconnected to form a first reference point, the first reference point being connected to the negative pole via a first resistor, a decoupling capacitor that is arranged in a serial connection between the half-bridge arrangement and the first or the second lamp filament, the connection of the decoupling capacitor on the filament side forming a second reference point that is connected to the negative pole via a second resistor, a comparator that has a first and a second input and an output, the first input being connected to the first reference point, and the second input being connected to the second reference point, the output being connected to the negative pole via a detection capacitor and an evaluation circuit with the aid of which the voltage dropping across the detection capacitor can be evaluated in order to deactivate the half-bridge arrangement upon overshooting of a predetermined voltage level.

PRIOR ART

Such a protective circuit is known and is, for example, installed by the Applicant of the present invention in ballasts for fluorescent lamps. The protective circuit consists in evaluating at the end of the service life of the fluorescent lamp, that is to say when the lamp is not yet defective, a criterion that leads in good time before overheating in the filament region (risk of fusing of the base) to a shutdown of the half-bridge arrangement (also known as end-of-life shutdown). Use is made in this case of the fact that the filaments of a fluorescent lamp are covered with emitter in order to reduce the work function of the electrons. In the closure phase, the absence of the emitter on one of the two lamp filaments of the fluorescent lamp becomes noticeable by virtue of the fact that the work function slowly increases again, and the voltage dropping across the decoupling capacitor changes thereby. In normal operation, that is to say when both filaments still have emitter, the two reference points lie on average at a potential that corresponds to half the voltage which is made available by the DC voltage source. At the end of service life, the second of the two reference points lies at a different potential, and the reference points are therefore at different potentials. The potential difference is used in order to charge a detection capacitor, the evaluation circuit advantageously being realized such that it is possible to set a voltage level upon the overshooting of which a deactivation of the half-bridge arrangement is effected.

The term “relamping” is known in conjunction with the replacement of a defective lamp. In the case of a lighting system comprising a plurality of lamps, this is understood as making possible the use of a new lamp without the need to switch off the supply voltage and therefore switch off the other lamps. However, the aim is to ensure that the line voltage connected during the entire replacement operation causes the newly inserted lamp to come on again immediately. Circuit structures are also known for this purpose. The disadvantage in the mode of procedure of the prior art resides in that the additional realization of the relamping function makes mass produced ballasts substantially more expensive, for which reason they are frequently omitted. The result is therefore expensive ballasts for which an end-of-life detection and relamping are realized, and there is a second category of ballasts, for which only the end-of-life detection is realized. In the case of the last mentioned ballasts, it is necessary, for example, for all the lamps to be switched off when, for example, replacing a fluorescent lamp in a factory hall, in order thereby to reset the end-of-life detection. Only after all the lamps have been switched off can a new lamp be inserted instead of the aging lamp. Subsequently, all the lamps can be switched on again. Such interruptions are undesirable, especially in large factory halls.

SUMMARY OF THE INVENTION

The object of the present invention therefore consists in making available a cost-effective realization of the end-of-life detection, and of the relamping function.

This object is achieved according to the invention by virtue of the fact that the generic protective circuit also has a third resistor that bridges the decoupling capacitor, and a fourth resistor that connects the first reference point to the positive pole of the DC voltage source, the first, the second, the third and the fourth resistor being selected such that the first and the second reference point are at the same potential without the fluorescent lamp inserted.

The invention is based on the idea of designing the end-of-life detection circuit or realizing the relamping function such that as many components as possible are used jointly. It is thereby possible in the case of a mass produced product such as the present protective circuit to realize the relamping additional function cost-effectively virtually without additional outlay, the result being a very desirable price reduction.

Here, the idea consists in that, with the fluorescent lamp removed, two inputs of the comparator, which detects asymmetry, are supplied with identical potentials which reset the switching-off of the half-bridge arrangement.

As already mentioned above, the two reference points lie on average at half the potential of the DC voltage made available by the DC voltage source. This is usually what is termed the DC link voltage, and is usually provided at a DC link capacitor. In a particularly preferred realization of the invention, the ratio of a first resistor to the fourth resistor is of the same magnitude as the ratio of the second resistor to the third resistor. Particularly in the case when the ratio is selected as 1, even with the fluorescent lamp removed, the two reference points lie at a potential that corresponds to half the DC voltage made available by the DC voltage source.

It is also preferred to use suitably dimensioned voltage dividers to apply only a lower voltage to the comparator. This results in a further cost reduction. For this purpose, the first resistor comprises a first and a second component resistor connected together in series, and the second resistor comprises a third and a fourth component resistor connected together in series, the first reference point being connected to the tie point of the first component resistor and the fourth resistor, and the second reference point being connected to the tie point of the third resistor and the third component resistor, and the first input of the comparator being connected to the tie point between the first and second component resistor, and the second input of the comparator being connected to the tie point between the third and the fourth component resistor. It is not necessary in this embodiment for all the resistors of the voltage dividers to be designed as high-voltage resistors. The comparator and evaluation circuits need likewise only be suitable for low voltage. However, it is sufficient to provide one high-voltage resistor per voltage divider, which results in a further cost reduction.

It is preferred for the ratio of the sum of the first and second component resistor to the fourth resistor to be equal to the ratio of the sum of the third and fourth component resistor to the third resistor. In the case in which the ratios are again selected as one, with the fluorescent lamp removed, the two reference points lie in turn at a potential that corresponds to half the DC voltage made available by the DC voltage source.

A particularly expedient realization of the comparator provides that the comparator comprises a first and a second switching element, which in each case comprise a working, a control and a reference electrode, the fourth component resistor comprising a fifth and a sixth component resistor connected together in series, the tie point between the first and the second component resistor being connected to the reference electrode of the first and to the control electrode of the second switching element, the tie point between the third component resistor and the fifth component resistor being connected to the control electrode of the first switching element, the tie point between the fifth and the sixth resistor being connected to the reference electrode of the second switching element, and the working electrode of the first switching element and the working electrode of the second switching element being interconnected and being connected to frame via a series circuit composed of a fifth resistor and the detection capacitor. In addition, the ratio of component resistors three, five and six can be used to set the potential difference that leads to starting the charging of the detection capacitor. The comparator is realized in a very simple and cost-effective form in this embodiment.

It is preferred for the ratio of the fourth resistor to the sum of the first and the second component resistor to be equal to the ratio of the third resistor to the sum of the third, fifth and sixth component resistor. Particularly in the case when the ratio is equal to 1, with the fluorescent lamp withdrawn the reference points are in turn at a potential that corresponds to half the DC voltage made available by the DC voltage source.

The evaluation circuit can comprise a holding element with a trigger potential and be designed in such a way that as soon as the trigger potential point has assumed a predetermined potential, in particular owing simply to a single pulse, the holding element can be activated in order to deactivate the half-bridge circuit until a resetting operation is triggered by removal of the fluorescent lamp. This measure ensures reliable deactivation of the half-bridge arrangement, and thus a particularly high reliability for the protective circuit according to the invention.

Between the comparator and the trigger potential point of the holding element can be arranged a first threshold component, in particular a Zener diode, with the aid of which it is possible to set the threshold upon the overshooting of which deactivation of the half-bridge circuit is triggered. This measure permits the holding element to be activated in the case of a prescribable voltage across the detection capacitor.

It is particularly advantageous for the combination of end-of-life detection and relamping function to be further combined with a starting-voltage-limiting circuit, for which purpose a starting-voltage-limiting circuit is connected to the trigger potential point in such a way that the same holding element can be activated upon detection of an overshooting of a predetermined starting voltage. Consequently, the holding element need be constructed only once, and this results in a further substantial cost reduction.

In this case, the starting-voltage-limiting circuit can have a measuring element for measuring a variable proportional to the starting current, such that the value of this variable can be used to activate the holding element. This embodiment utilizes the fact that the starting current is approximately proportional to the starting voltage and can therefore be used as a measure of the starting voltage. Since the starting current is easier to measure than the starting voltage, this results in a simpler design of the circuit arrangement.

It is preferred to arrange between a potential point of the starting voltage limiting circuit whose potential is proportional to the starting current, and the trigger potential point of the holding element a second threshold component, in particular a Zener diode, with the aid of which it is possible to set the threshold upon the overshooting of which a deactivation of the half-bridge circuit is triggered. This variant permits a particularly simple adaptation of the potentials of the starting-voltage-limiting circuit to the potentials of the holding element.

The measuring element can be, in particular, a resistor which is arranged in series with one of the half-bridge switches. This embodiment is based on the finding that the starting current is also made available by the half-bridge arrangement, and therefore the current flowing through the half-bridge arrangement is proportional to the starting current. A variable proportional to the starting current can be determined with particular ease by virtue of the fact that a resistor is arranged as measuring element in series with one of the half-bridge switches.

Switching a storage capacitor between positive and negative poles is generally customary. Operating circuits exist for fluorescent lamps in the case of which the voltage across the said storage capacitor rises with rising amplitude of the starting voltage. What are termed 'pump circuits' are a type of operating circuit that have this property. In the case of these circuits, it is possible to monitor the starting voltage by monitoring the voltage across said storage capacitor. For this purpose, the trigger potential point of the holding element is connected via a starting-voltage-limiting circuit to the voltage of the storage capacitor. In the simplest case, the starting-voltage-limiting circuit consists of a resistor which adapts the voltage across the storage capacitor to the trigger voltage, required for triggering, at the trigger potential point.

It is preferred for the embodiments according to the invention also to comprise suitable filter circuits in order to provide DC voltages for evaluation at the reference and potential points. As is evident to the person skilled in the art, the half-bridge arrangement converts the DC voltage made available by the DC voltage source into an AC voltage that is mirrored in the downstream protective circuit. DC voltages are substantially of interest for evaluating the signals at the reference points, and so it is ensured by means of suitable filter circuits, for example using capacitors, that the same are provided for further processing.

Further advantageous embodiments are to be gathered from the subclaims.

DESCRIPTION OF THE DRAWINGS

Exemplary embodiments of the invention are explained in more detail below with reference to the attached drawings, in which.

Identical reference symbols are used throughout below for the same and equivalent elements of the various exemplary embodiments.

MAIN PART OF THE DESCRIPTION

Figure 1:
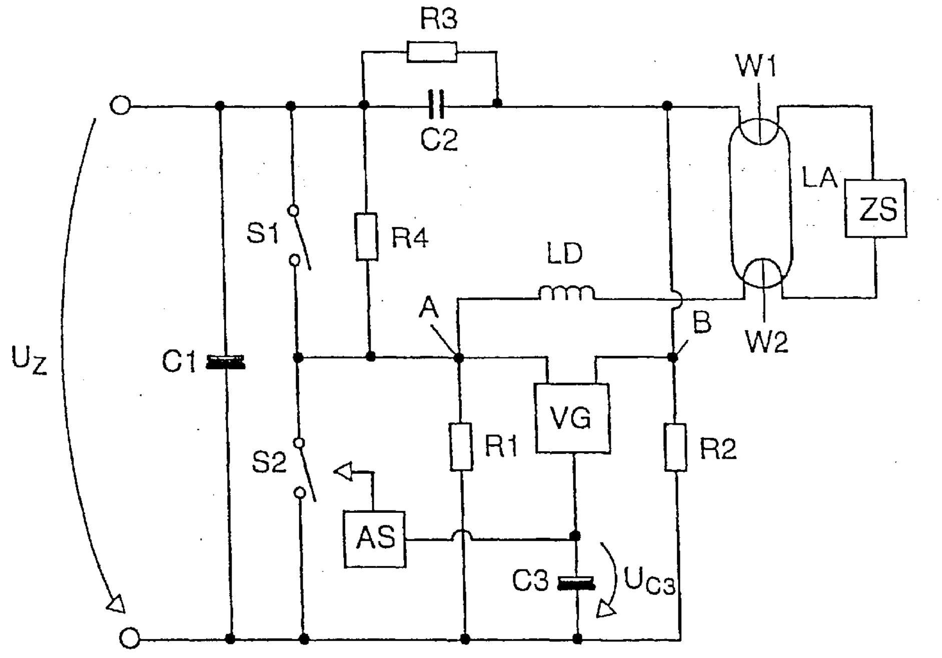
FIG. 1 shows a first embodiment of a protective circuit according to the invention.

In the circuit arrangement illustrated in FIG. 1, a capacitor C1 provides a voltage $U_Z$ that serves to supply the downstream circuit arrangement. A half-bridge arrangement comprises a first switch S1 and a second switch S2. The drives of the switches S1 and S2 are sufficiently known to the person skilled in the art and are therefore not illustrated in FIG. 1 for reasons of clarity. A fluorescent lamp $L_A$ with a first filament W1 and a second filament W2 is fed via a decoupling capacitor C2 by the half-bridge arrangement. The fluorescent lamp $L_A$ is connected to a starting circuit $Z_S$ which is designed for starting the lamp $L_A$.

The midpoint of the half-bridge arrangement forms a first reference point A, which is connected to the lamp $L_A$ via a lamp inductor $L_D$. The filament-side terminal of the decoupling capacitor C2 forms a second reference point B. The potentials of the two reference points A, B are fed to a comparator $V_G$ whose output is connected to a detection capacitor C3. The voltage $U_{C3}$ dropping across the capacitor C3 is fed to an evaluation circuit $A_S$ that deactivates the half-bridge arrangement upon the overshooting of a predetermined voltage level. At the end of the service life of the lamp $L_A$ the potentials of the reference points A and B are displaced as a consequence of the absence of emitter on one of the two filament electrodes W1, W2 and of the increase produced thereby in the work function of one of the two filament electrodes W1, W2, even if the increase in the work function is only minimal. The potential difference between the reference points leads to charging of the capacitor C3 and thus to establishment of the voltage $U_{C3}$. If the latter overshoots a specific value, the evaluation circuit $A_S$ shuts down the half-bridge arrangement and thereby reduces overheating in the filament region. In normal operation, the reference points A and B lie on average at half the voltage $U_Z$. The decoupling capacitor C2 could also be arranged at another site, for example between the lamp inductor $L_D$ and the filament electrode W2. In the present arrangement, in the event of consumption of the emitter on the filament electrode W1 the voltage at the filament electrode W1 would rise before consumption of the emitter on the filament electrode W2, and this would lead to a rise in the voltage dropping across the capacitor C2. Consequently, the potential B would rise by comparison with the potential A. In the event of consumption of the emitter on the filament electrode W2 before consumption of the emitter on the filament electrode W1, the potential at the reference point A would drop by comparison with the potential at the reference point B.

A relamping function is realized by virtue of the fact that the voltage across the capacitor C3 is reset by applying an identical potential to the two inputs of the comparator. For this purpose, the first reference point A is connected to the negative pole of the voltage $U_Z$ via a resistor R1, and the second reference point B is connected via a resistor R2. The positive pole of the voltage $U_Z$ is connected, on the one hand, to the reference point B via a resistor R3, which bridges the capacitor C2, and on the other hand to the reference point A via a resistor R4. By suitably dimensioning the two voltage dividers R4, R1 and R3, R2, respectively, it is possible for the potentials at the reference points A, B to be identical with the lamp $L_A$ removed, and thus to cause the resetting of the end-of-life detection. In particular, when the dimensioning of the ratio of the resistor R1 to the resistor R4, and of the resistor R2 to the resistor R3 is equal to 1, half the voltage of $U_Z$ is set at the two reference points A, B.

Figure 2:
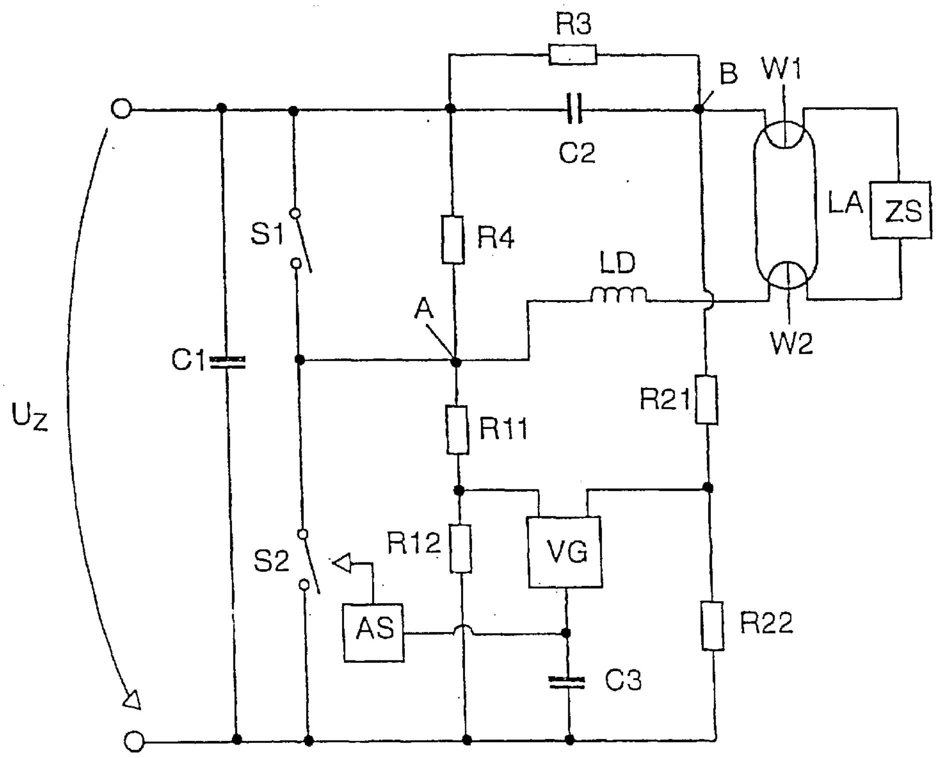
FIG. 2 shows a second embodiment of a protective circuit according to the invention.

In the case of the embodiment illustrated in FIG. 2, the resistors R1 and R2 are split up into two component resistors R11, R12 and R21, R22, respectively. Suitable dimensioning of the component resistors can ensure that the majority of the voltages that are present at the reference points A, B drop across the component resistors R11 and R21, respectively. Consequently, only low voltages are applied to the comparator $V_G$, and it can therefore be realized with components of lower electric strength.

Figure 3A:
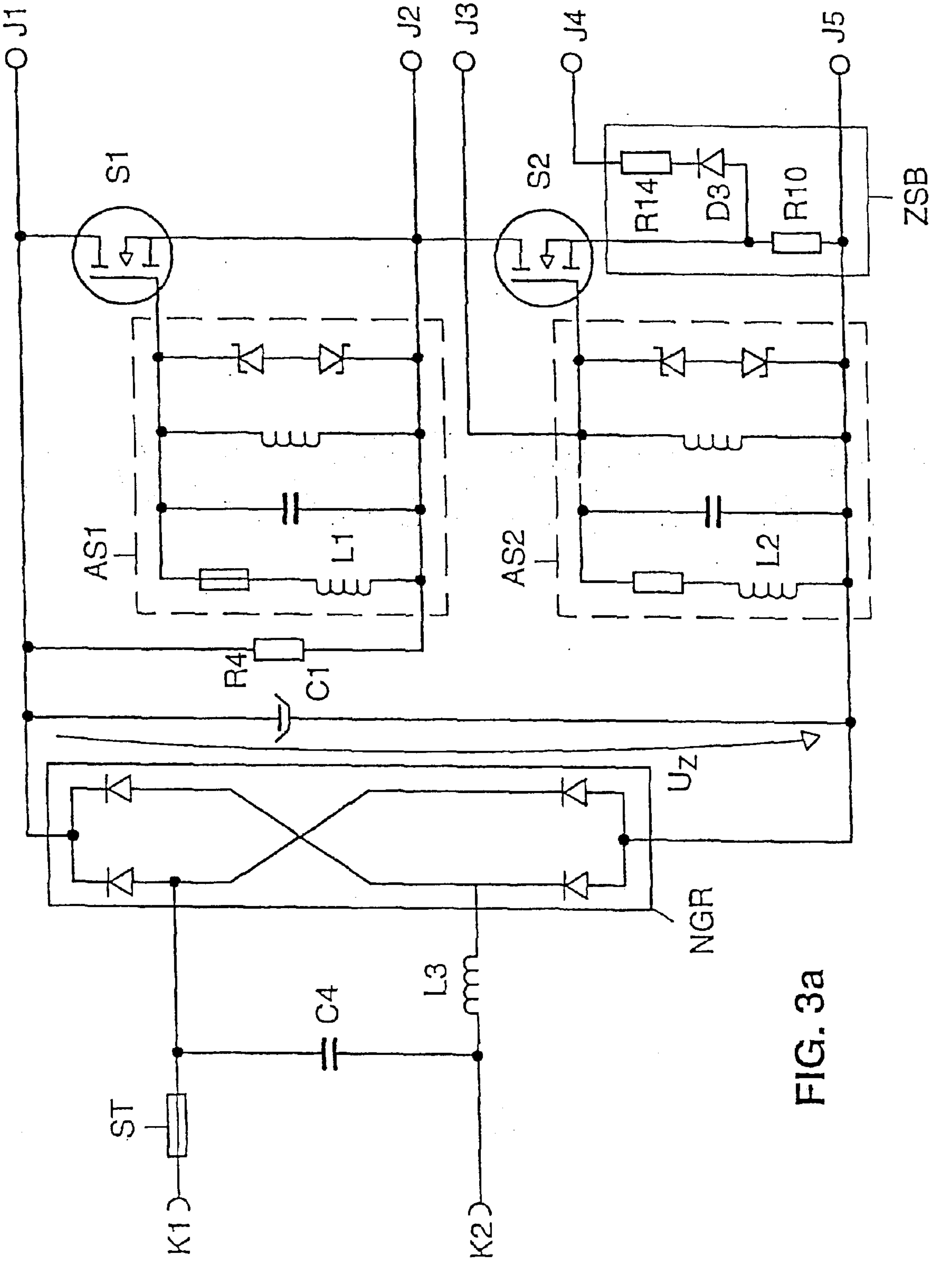
FIGS. 3*a*/*b* show a third embodiment of a protective circuit according to the invention. This third embodiment is split up into FIG. 3*a* and FIG. 3*b* for reasons of space. The circuit sections of FIGS. 3*a* and 3*b* are to be understood as connected to the corresponding terminals J1–J5. Reference is made to these figures with the designation FIGS. 3*a*/*b*.
Figure 3B:
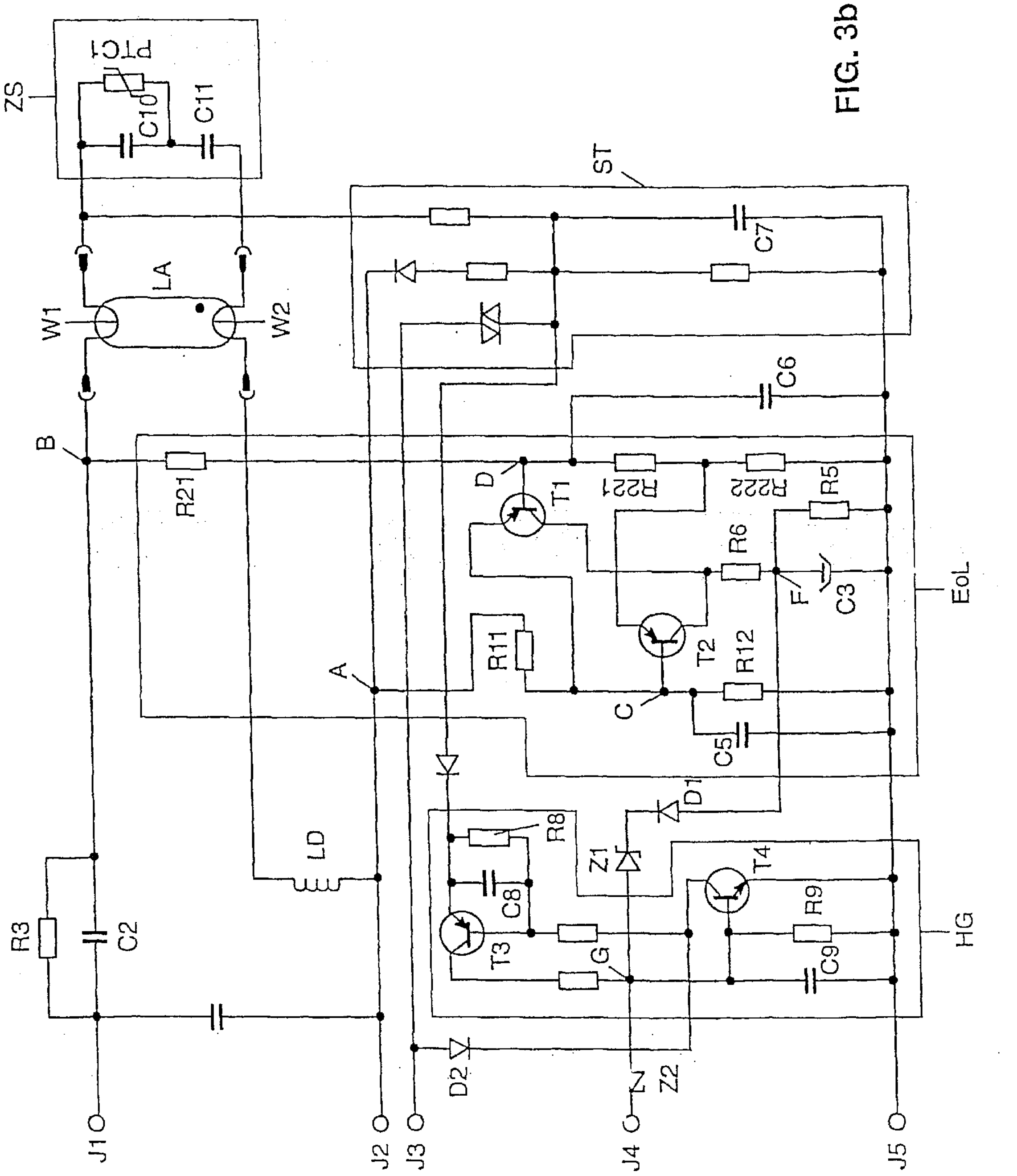

In the embodiment illustrated in FIGS. 3*a*/*b*, an overall circuit for operating a fluorescent lamp is illustrated that can be connected to an electrical network via the terminals K1 and K2. Arranged downstream of the terminal K1 is a fuse SI, which is followed by a filter circuit comprising a capacitor C4 and an inductor L3 before the line signal is rectified in a line rectifier $N_{GR}$. The rectified output signal of the line rectifier $N_{GR}$ is buffered in the capacitor C1 and serves to supply the downstream circuit arrangement. The resistor R22 of FIG. 2 is split up into two component resistors R221 and R222. The capacitor C3 is connected in parallel with a resistor R5 that permits the capacitor C3 to be discharged. The resistor R12 is connected in parallel with a capacitor C5, while the series circuit composed of the resistors R221 and R222 is connected in parallel with a capacitor C6. These measures ensure that DC voltage signals are present at the bases of two switching elements T1, T2 included in the comparator. The control electrode of the switching element T1 is connected to the tie point D between the resistor R21 and the resistor R221. The reference electrode of the switching element T1, on the one hand, and the control electrode of the switching element T2, on the other hand, are connected to the tie point C of the resistors R1 and R12. The reference electrode of the switching element T2 is connected to the tie point E between the resistors R221 and R222. The working electrodes of the two switching elements T1, T2 are connected via a resistor R6 to the tie point F at which the capacitor C3 is connected. Since the voltage is constant at the reference point A, a voltage of 15 V can be set at the tie point C, for example, by suitable selection of the resistors R11 and R12. By suitably dimensioning the resistors R21, R221 and R222, it is possible in normal operation, that is to say the potential at point A is equal to the potential at point B, to set a voltage that is 18 V at point D and 12 V at point E. The two switching elements T1, T2 are blocked in this state.

If the voltage at the reference point B now rises, the voltages at points D and E rise. If the voltage at point D is higher than the voltage at point C, the switching element T1 remains blocked, as before. If, however, the voltage at point E is higher than the voltage at point C, the switching element T2 begins to conduct, and the capacitor C3 is thereby charged via the resistor R6.

In the case in which the voltage at point B drops, the switching element T1 begins to conduct when the voltage of point D is lower than the voltage at point C. The switching element T2 remains blocked as long as the voltage at the point E is lower than the voltage at point C. The capacitor C3 is charged, in turn, by the resistor R6 by the conduction of the switching element T1. It is possible, in addition, to set the operating point, and thus the degree of asymmetry at which shutdown is performed with the aid of the magnitude of the voltage difference between the potential points C and D or C and E. The voltage at point F, which corresponds to the state of charge of the capacitor C3, is transmitted to a trigger potential point G in a holding element HG via a diode D1 and a Zener diode Z1. The holding element HG is supplied via the charge stored in a capacitor C7 of a starting circuit ST. The switching element T4 switches through as soon as the voltage at point G rises. As soon as the switching element T4 has switched through, the switching element T3 switches through and thus supplies the holding current for a holding element that is self-holding in this way. The resistor R8 in combination with the capacitor C8, and the resistor R9 in combination with the capacitor C9 ensure the removal of interference, thus preventing inadvertent activation of the holding element. Because the switching element T4 is conducting, the potential at point I drops to 0 V. The two switches S1 and S2 of the half-bridge circuit have respective drive circuits $A_{S1}$, $A_{S2}$. Each drive circuit $A_{S1}$, $A_{S2}$ comprises an inductor L1, L2 that is coupled to the lamp inductor $L_D$. As soon as the potential at point I drops to 0 V, the diode D2 starts to conduct and thereby grounds the signal fed into the drive circuit $A_{S2}$ via the inductor L2, such that the switch S2 is no longer driven. The switch S1 is also switched off as a result.

A voltage-limiting circuit $Z_{SB}$ is also connected to the point G of the holding element $H_G$. Said circuit comprises a measuring resistor R10 which is arranged in series with the switch S2. The potential at point J, that is to say the voltage dropping across the resistor R10, is proportional to the starting current, and thus proportional to the starting voltage. The task of the starting-voltage-limiting circuit $Z_{SB}$ is to prevent destruction of the starting circuit $Z_S$, for example in the event of air leaks. The starting circuit $Z_S$ comprises two capacitors C10 and C11 as well as a PTC1 thermistor.

The resistor R14 serves to effect a time delay in the response of the starting-voltage-limiting circuit. It is possible via the diodes D3 and Z2 to set the level at which the starting voltage is limited by application to the point G of the holding element $H_G$, and thus the half-bridge arrangement is shut down. The voltage across the resistor R10 is filtered by the resistor R9 and the capacitor C9. Of course, the level of the critical starting voltage can also be influenced by the value of the resistor R10. The diode D3 protects the holding element $H_G$ against negative voltage peaks, in addition. The components of the starting circuit $Z_S$ and the lamp inductor $L_D$ can be given smaller dimensions by means of the starting voltage limiting circuit $Z_{SB}$.

What is claimed is:

1. A protective circuit for a fluorescent lamp ($L_A$) with a first and a second lamp filament (W1, W2), comprising:

a DC voltage source ($U_Z$) with a positive and a negative pole;

a half-bridge arrangement with a first and a second switch (S1, S2), the half-bridge arrangement being fed by the DC voltage source ($U_Z$), and the first and the second switch (S1, S2) being interconnected to form a first reference point (A), the first reference point (A) being connected to the negative pole via a first resistor (R1);

a decoupling capacitor (C2) that is arranged in a serial connection between the half-bridge arrangement and the first or the second lamp filament (W1; W2), the connection of the decoupling capacitor (C2) on the filament side forming a second reference point (B) that is connected to the negative pole via a second resistor (R2);

a comparator ($V_G$) that has a first and a second input and an output, the first input being connected to the first reference point (A), and the second input being connected to the second reference point (B), the output being connected to the negative pole via a detection capacitor (C3);

an evaluation circuit ($A_S$) with the aid of which the voltage ($U_{C3}$) dropping across the detection capacitor (C3) can be evaluated in order to deactivate the half-bridge arrangement upon overshooting of a predetermined voltage level;

characterized in that it further comprises a third resistor (R3) that bridges the decoupling capacitor (C2), and a fourth resistor (R4) that connects the first reference point (A) to the positive pole of the DC voltage source ($U_Z$), the first, the second, the third and the fourth resistor (R1, R2, R3, R4) being selected such that the first and the second reference point (A, B) are at the same potential without the fluorescent lamp ($L_A$) inserted.

2. The protective circuit as claimed in claim 1, characterized in that the ratio of the first resistor (R1) to the fourth resistor (R4) is of the same magnitude as the ratio of the second resistor (R2) to the third resistor (R3), in particular is equal to 1.

3. The protective circuit as claimed in claim 1, characterized in that the first resistor (R1) comprises a first and a second component resistor (R11, R12) connected together in series, and the second resistor comprises a third and a fourth component resistor (R21, R22) connected together in series, the first reference point (A) being connected to the tie point of the first component resistor (R11) and the fourth resistor (R4), and the second reference point (B) being connected to the tie point of the third resistor (R3) and the third component resistor (R21), and the first input of the comparator ($V_G$) being connected to the tie point between the first and second component resistor (R11, R12), and the second input of the comparator (VG) being connected to the tie point between the third and the fourth component resistor (R21, R22).

4. The protective circuit as claimed in claim 3, characterized in that the ratio of the sum of the first and second component resistor (R11, R12) to the fourth resistor (R4) is equal to the ratio of the sum of the third and fourth component resistor (R21, R22) to the third resistor (R3), in particular is equal to 1.

5. The protective circuit as claimed in claim 1, characterized in that the comparator ($V_G$) comprises a first and a second switching element (T1, T2), which in each case comprise a working, a control and a reference electrode, the fourth component resistor (R22) comprising a fifth and a sixth component resistor (R22l, P222) connected together in series, the tie point between the first and the second component resistor (R11, Rl2) being connected to the reference electrode of the first (T1) and to the control electrode of the second switching element (T2), the tie point between the third component resistor (R21) and the fifth component resistor (R221) being connected to the control electrode of the first switching element (T1), the tie point between the fifth and the sixth resistor (R221, R222) being connected to the reference electrode of the second switching element (T2), and the working electrode of the first switching element (T1) and the working electrode of the second switching element (T2) being interconnected and being connected to frame via a series circuit composed of a fifth resistor (R5) and the detection capacitor (C3).

6. The protective circuit as claimed in claim 5, characterized in that the ratio of the fourth resistor (R4) to the sum of the first and the second component resistor (R11, R12) is equal to the ratio of the third resistor (R3) to the sum of the third, fifth and sixth component resistor (R21, R221, R222), in particular is equal to 1.

7. The protective circuit as claimed in claim 1, characterized in that the evaluation circuit ($A_s$) comprises a holding element ($H_G$) with a trigger potential point (G) and is designed in such a way that as soon as the trigger potential point (G) has assumed a predetermined potential, in particular owing simply to a single pulse, the holding element ($H_G$) can be activated in order to deactivate the half-bridge circuit until a resetting operation is triggered by removal of the fluorescent lamp ($L_A$).

8. The protective circuit as claimed in claim 7, characterized in that arranged between the comparator ($V_G$) and the trigger potential point (G) of the holding element ($H_G$) is a first threshold component (Z1), in particular a Zener diode, with the aid of which it is possible to set the threshold upon the overshooting of which deactivation of the half-bridge circuit is triggered.

9. The protective circuit as claimed in claim 7, characterized in that a starting-voltage-limiting circuit ($Z_{SB}$) is connected to the trigger potential point (G) in such a way that the holding element ($H_G$) can be activated upon detection of an overshooting of a predetermined starting voltage.

10. The protective circuit as claimed in claim 9, characterized in that the starting-voltage-limiting circuit ($Z_{SB}$) has a measuring element (R10) for measuring a variable proportional to the starting current, such that the value of this variable can be used to activate the holding element ($H_G$).

11. The protective circuit as claimed in claim 10, characterized in that arranged between a potential point (J) of the starting-voltage-limiting circuit ($Z_{SB}$) whose potential is proportional to the starting current, and the trigger potential point of the holding element ($H_G$) is a second threshold component (Z2), in particular a Zener diode, with the aid of which it is possible to set the threshold upon the overshooting of which a deactivation of the half-bridge circuit is triggered.

12. The protective circuit as claimed in claim 10 characterized in that the measuring element (R10) is a resistor which is arranged in series with one of the half-bridge switches (S1; S2).

13. The protective circuit as claimed in claim 11, characterized in that it also comprises suitable filter circuits (C6, C5, C8, R8, C9, R9, R14) in order to provide DC voltages for evaluation at the reference and potential points (A, B, G, J).

* * * * *